United States Patent [19]

Weitemeyer et al.

[11] Patent Number: 5,145,915

[45] Date of Patent: Sep. 8, 1992

[54] CURABLE ORGANOPOLYSILOXANES HAVING OXYALKYLENE ETHER GROUPS ETHER GROUPS LINKED THROUGH SIC GROUPS, A METHOD FOR THEIR PREPARATION AND THEIR USE

[75] Inventors: Christian Weitemeyer; Hardi Döhler, both of Essen, Fed. Rep. of Germany

[73] Assignee: Th. Goldschmidt AG, Essen, Fed. Rep. of Germany

[21] Appl. No.: 651,580

[22] Filed: Feb. 6, 1991

[30] Foreign Application Priority Data

Mar. 28, 1990 [DE] Fed. Rep. of Germany ....... 4009889

[51] Int. Cl.[5] ........................ C08G 65/32; C08G 77/06
[52] U.S. Cl. .................................... 525/403; 525/479; 528/31; 528/25; 528/15
[58] Field of Search .............................. 528/31, 25, 15; 525/479, 403

[56] References Cited

U.S. PATENT DOCUMENTS

| | | | |
|---|---|---|---|
| 4,421,904 | 12/1983 | Eckberg et al. | 528/27 |
| 4,431,789 | 2/1984 | Okazaki et al. | 528/15 |
| 4,617,238 | 10/1986 | Crivello et al. | 428/452 |
| 4,857,583 | 8/1989 | Austin et al. | 528/25 |
| 4,906,721 | 3/1990 | Weitemeyer et al. | 528/31 |
| 5,057,549 | 10/1991 | Herzig et al. | 522/99 |

OTHER PUBLICATIONS

"Epoxysilicone Release Coatings UV Cure Instantly in Air", by Richard P. Eckberg et al, Apr. 1989.

*Primary Examiner*—Melvyn I. Marquis
*Assistant Examiner*—M. W. Glass
*Attorney, Agent, or Firm*—Anderson Kill Olick et al.

[57] ABSTRACT

Curable polysiloxanes having oxyalkylene vinyl ether groups linked through SiC groups are disclosed wherein the vinyl groups may be substituted by alkyl. Methods for producing these compounds and their use as preferably photochemically curable polysiloxanes in various products are also disclosed.

20 Claims, No Drawings

CURABLE ORGANOPOLYSILOXANES HAVING OXYALKYLENE ETHER GROUPS ETHER GROUPS LINKED THROUGH SIC GROUPS, A METHOD FOR THEIR PREPARATION AND THEIR USE

FIELD OF INVENTION

The invention generally relates to polysiloxanes and is particularly concerned with curable polysiloxanes having oxyalkylene ether groups which are linked to the polysiloxane through SiC groups.

More particularly, the invention deals with curable polysiloxanes having oxyalkylene vinyl ether groups linked through SiC groups, wherein the vinyl groups may be substituted by alkyl groups.

Considered from another aspect, the invention is concerned with a method for preparing such polysiloxane compounds.

The invention is also concerned with the use of such polysiloxane compounds, preferably as photochemically curable polysiloxanes in casting masses, as abhesive coatings for flat or planar carriers, or as modifying additives in compounds which are curable by free radicals, cationically or through UV or electron radiation.

BACKGROUND INFORMATION AND PRIOR ART

In addition to the systems which, through the action of UV, cure and are polymerized by free radicals, more recently cationically curable systems have been developed which contain epoxy or vinyl ether compounds. In the latter type of systems, the curing or hardening is initiated particularly by diaryliodonium and triarylsulfonium salts. There is a definite advantage in such cationically curable systems in that the curing reaction is not affected by and is insensitive to the oxygen in the air. Moreover, more rapid film hardening is accomplished and the systems are particularly harmless to the environment.

Cationically curable systems on the basis of epoxy functional organopolysiloxanes have been described in numerous patents, of which U.S. Pat. No. 4,421,904 may be mentioned as an example. A relatively comprehensive representation appears in the journal *Adhesives Age*, 1989, 24–27. This publication discloses and describes epoxy group containing siloxanes as they are available on the market for the abhesive coating of flat carrier material.

With a view to accomplishing cationic polymerization of compounds which contain vinyl ether groups, which may be substituted, catalysts of low acid strength are sufficient. Contrary to compounds containing epoxy groups, not only the customary salt-like diaryliodonium and triarylsulfonium compounds, but also non-salt-like compounds such as, for example, ketosulfones may be used as photo initiators.

Cationically curable vinyl ether groups containing organopolysiloxanes have been disclosed in U.S. Pat. No. 4,617,238. This patent discloses a procedure wherein the vinyl ether group is introduced into the organopolysiloxane by addition (hydrosilylation) of compounds having an allyl and a vinyl ether group to an SiH group of the organopolysiloxane. In doing so, only the allyl groups is added to the SiH group while the vinyl ether group is maintained. It follows from the above that per SiH group, in each case only one vinyl ether group can be incorporated into the siloxane molecule.

OBJECT OF THE INVENTION

It is the primary object of the present invention to provide organopolysiloxanes which contain any suitable number of vinyl ether groups, which may be substituted, without being limited by the number of SiH groups which are present in the starting product. In this manner it is rendered possible optimally to influence and to control the curing and cross linking properties within wide limits.

It is a further object of the invention to provide organopolysiloxanes of the indicated kind which can be prepared in an exceedingly simple manner.

Moreover, it is an object of the invention to obviate, during the production of the organopolysiloxanes, use of toxic reaction partners such as, for example, chloroethylvinyl ether.

Pursuant to the invention, curable organopolysiloxanes having oxyalkylene ether groups linked via SiC groups have the general average formula

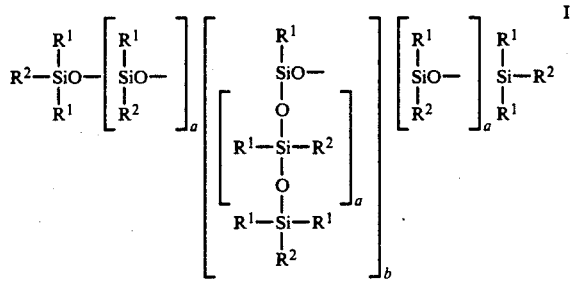

wherein $R^1$ are the same or different and represent alkyl of 1 to 4 carbon atoms or phenyl, with the proviso that at least 90% of the $R^1$ groups are methyl;

$R^2$ are the same or different and are represented by:
 (a) alkyl with 1 to 20 carbon atoms, aryl or aralkyl,
 (b) oxyalkylene ether groups of the general formula

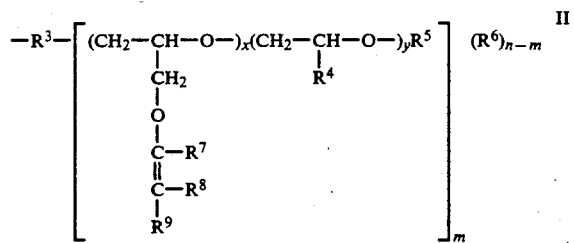

wherein $R^2$ is a (n+1) valent group which is linked with a silicon atom of the organopolysiloxane through a —SiC— linkage and with m polyether groups through —C—C—,

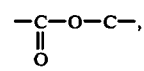

—C—)—C— or —C—N—C— bonds;

$R^4$ is hydrogen, alkyl or $R^5OCH_2$;

$R^5$ and $R^6$ are hydrogen, alkyl or acyl with the groups $R^4$, $R^5$ and $R^6$ being the same or different in the molecule;

$R^7$, $R^8$ and $R^9$ are hydrogen or alkyl with 1 to 8 carbon atoms, or wherein the groups $R^7$ and $R^8$ or $R^8$ and $R^9$ jointly form a component of a cyclic, non-aromatic hydrocarbon group with 5 or 6 carbon atoms;

n has a value of 1 through 5;

m has a value of 1 through 5 but is not larger than n;

x in the average molecule has a value of 1 to 100; and y in the average molecule has a value of 0 to 100, with the proviso that $1 < x+y < 150$;

a has a value of 1 to 1000; and b has a value of 0 to 10, with the proviso that in the average organopolysiloxane molecule, at least one $R^2$ group is an oxyalkylene ether group of formula II.

It will be realized that compounds of the above average general formula may contain vinyl ether groups---which may be substituted--in varying amounts.

The $R^1$ groups may be the same or different within the molecule and are alkyl groups with 1 to 4 carbon atoms or phenyl groups. The alkyl groups may thus be methyl, ethyl, propyl or butyl. However, it is important that the condition is fulfilled that in the average molecule at least 90% of the $R^1$ groups are methyl. Particularly preferred are organopolysiloxanes in which all the $R^1$ groups are methyl. With a view to influencing the abhesive characteristics, it may also be advantageous if up to 10% of the $R^1$ groups are constituted of phenyl.

The $R^2$ groups, as the $R^1$ groups, may be the same or different within the molecule. $R^2$ may thus be formed by (a) alkyl with 1 to 20 carbon atoms, aryl or aralkyl or (b) oxyalkylene ether groups of the general formula II, wherein the condition must be fulfilled that, in the average organopolysiloxane molecule of formula I, at least one $R^2$ group stands for oxyalkylene ether of formula II. Preferably, 1 to 30 $R^2$ groups in the average molecule are oxyalkylene ether groups. Particularly preferred are compounds wherein 2 to 15 oxyalkylene ether groups are present in the molecule.

If $R^2$ stands for alkyl with 1 to 20 carbon atoms, then it may have the same meaning as $R^1$. However, $R^2$ may also have more than 4 carbon atoms and may be linear or branched. Examples of such groups are octyl, isooctyl, nonyl, decyl, dodecyl and hexadecyl. The alkyl groups may be substituted.

If $R^2$ stands for aryl, then the phenyl group is particularly preferred. Other examples of suitable aryl groups are tolyl and xylyl.

As to the aralkyl groups, phenylethyl and 2-phenylpropyl are the preferred groups.

Particularly characteristic for the inventive curable organopolysiloxanes are the oxyalkylene ether groups of the general formula

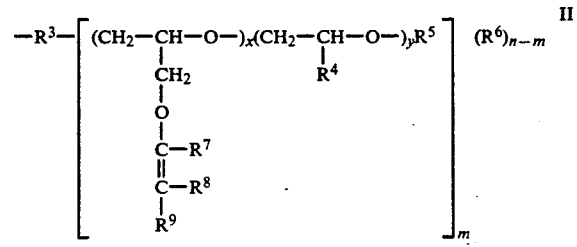

II

As is clear from formula II, the oxyalkylene ether groups are connected with the polysiloxane molecule through the group $R^3$. $R^3$ is a group having a valence of $(n+1)$. It bridges the polysiloxane with a polyether group.

In doing so, the group $R^3$ is linked with a silicon atom of the organopolysiloxane through a —Si—C— bond and with m polyether groups through, in each case, a —C—C—,

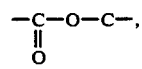

—C—O—C— or —C-N—C— linkage.

This kind of linkage can be diagrammatically represented for n=1 as follows:

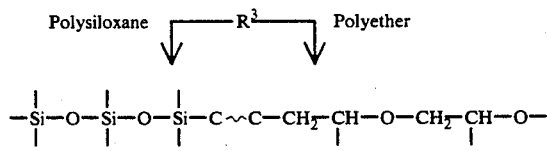

or

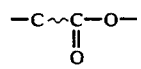

or

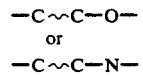

or

It follows that, in being linked to the polyether groups, $R^3$:

(i) through a —C—C— linkage, is a straight chain or branched hydrocarbon (ii) through a —C-0—C— linkage, is a hydrocarbon oxy group with up to 5 oxy groups wherein the carbon chain may be interrupted by oxygen under ether formation;

(iii) through a

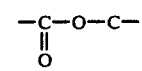

linkage, is a hydrocarbon carboxy groups with up to 3 carboxy groups;

(iv) through a —C—N—C— linkage, is a hydrocarbon group with a mono- or di-substituted amino group, one carbon atom of the hydrocarbon group being in each case connected with an Si atom of the polysiloxane.

Examples for the $R^3$ groups are:

—C—C linkage: —(XCH$_2$)$_3$—, —(CH$_2$)$_4$—

The kind of linkage is obtained when alkyllithium compounds are, through an addition reaction, added to alkylene oxide of the formulas

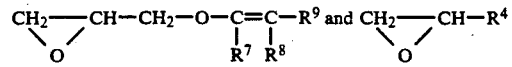

—C—O—C linkage: —(CH$_2$)$_3$—O—, —(CH$_2$)$_{11}$—O—,

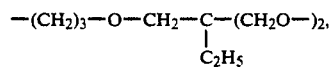

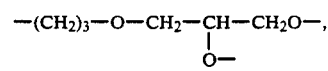

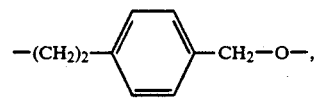

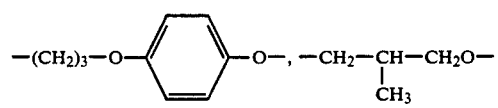

The —C—O—C— linkage occurs by the addition of the above-mentioned alkylene oxides to mono- or multihydric alcohols or phenols.

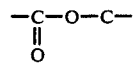

linkage:
—(CH$_2$)$_{10}$—COO—,

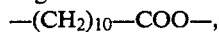

The

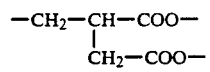

linkage takes place by addition of the above-mentioned alkylene oxides to mono- or multivalent carboxylic acids. If alkyleneoxide is added to hydroxycarboxylic acids, both —C—O—C— and also

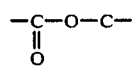

linkages are obtained.
—C—N—C— linkage:
—(CH$_2$)$_3$—N<,

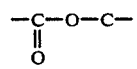

The —C—N—C— linkage takes place in the addition of the above-mentioned alkylene oxides to mono- or dialkyl-substituted amines.

It is clear from the above examples that R$^3$ is widely variable with respect to its structure.

R$^4$ is hydrogen, alkyl or R$^5$OCH. This group can also have different meanings within the polymeric molecule. If R$^4$ is alkyl, then alkyl with 1 to 12 carbon atoms is preferred. Preferably, R$^4$ is hydrogen, methyl, ethyl, HOCH$_2$ or CH$_3$OCH$_2$.

The groups R$^5$ and R$^6$ are the same or different and stand for hydrogen, alkyl or acyl. As to the alkyl groups, particularly the lower alkyl groups with 1 to 4 carbon atoms are preferred. In respect to acyl groups, those with 2 to 7 carbon atoms are suitable. Preferred is acetyl.

The groups R$^7$, R$^8$ and R$^9$ are hydrogen or alkyl groups. The groups R$^7$, R$^8$ and R$^8$, R$^9$, respectively, may in each case jointly form the component of a cyclic, non-aromatic hydrocarbon group with 5 or 6 carbon atoms. Examples are:

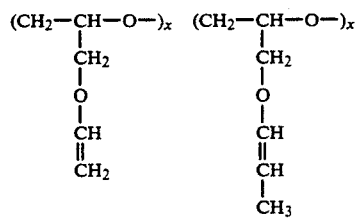

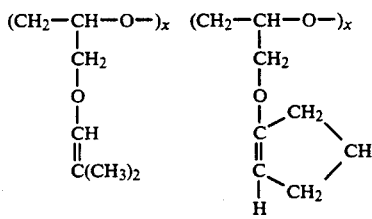

Preferably, at least one of the groups R$^7$, R$^8$, R$^9$ is alkyl. Particularly preferred is alkyl for the grou and/or R$^8$ and/or R$^9$, preferably methyl, while R$^7$ is preferably hydrogen.

If R$^8$ and R$^9$ are different, cis-trans-isomeric compounds could possibly be formed. However, both forms are suitable for the purposes of this invention.

The subscript n has a value of 1 to 5. The same applies to m; however, m may not be larger than n. Preferably, n=m.

x in the average molecule has a value of 1 to 100, preferably 1 to 25, and in particular 2 to 4.

y in the average molecule has a value of 0 to 100, wherein the condition 1<x+y<150 has to be met. Preferably, the condition 1<x+y<150 is met.

The product m·x has preferably a value of >1, particularly 2 to 25. The product m·y has a value of 0 to 25.

The subscripts a and b characterize the structure of the polysiloxane. Subscript a defines the number of the difunctional Si units and has a value of 1 to 1000. Subscript b indicates the number of the trifunctional units and has a value of 0 to 10. Preferably, a has a value of 5 to 200, and b a value of 0 to 2. The particularly preferred value for b is 0

Examples for compounds of formula I are:

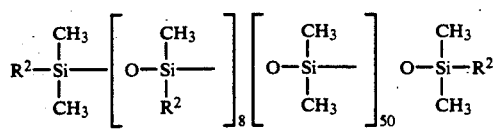

wherein R$^2$ is 20%

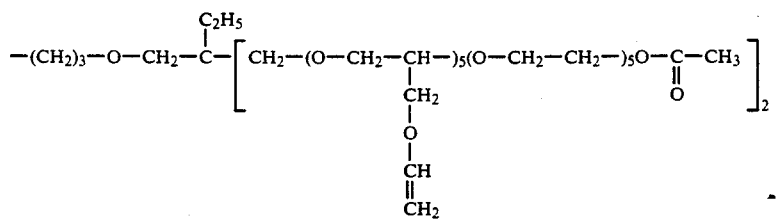
and 80%
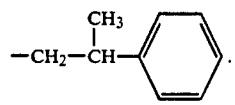
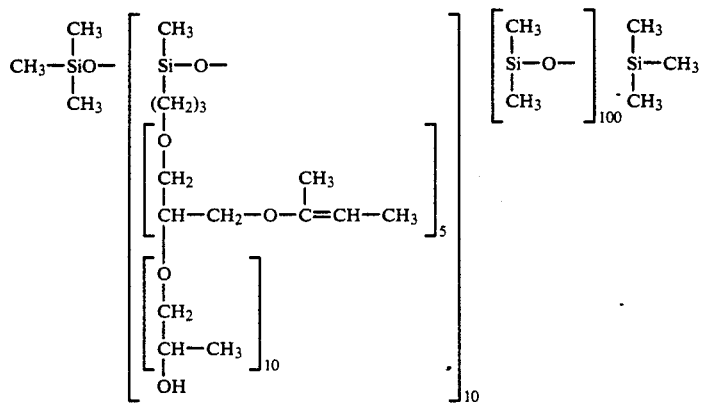
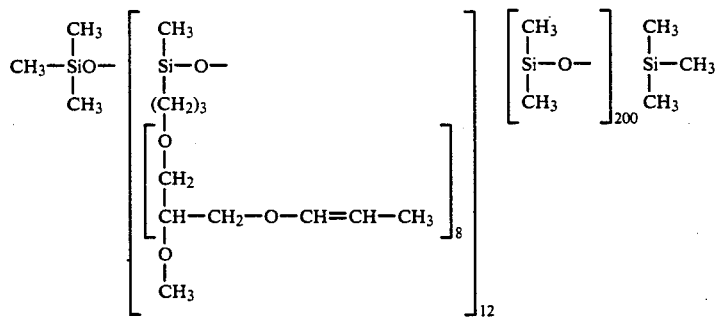
Examples for oxyalkylene ether groups of formula II are:
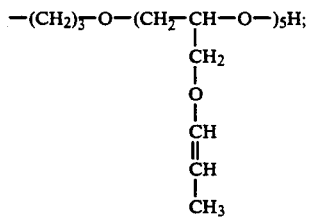
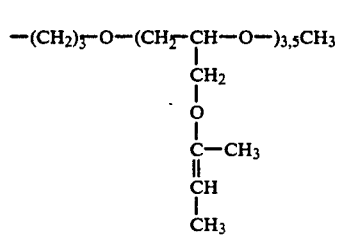
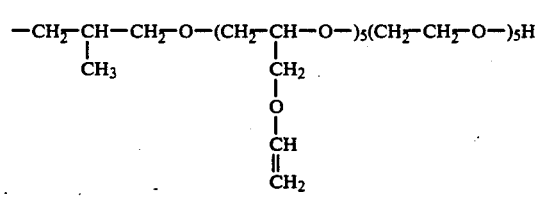
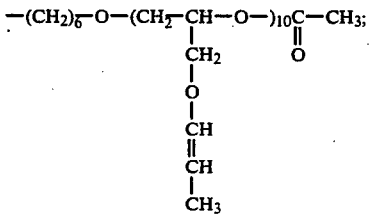

-continued

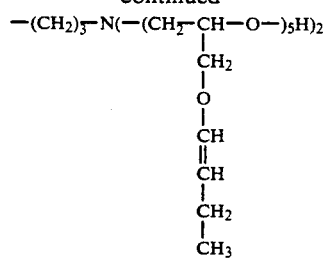

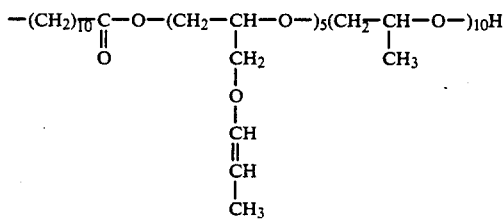

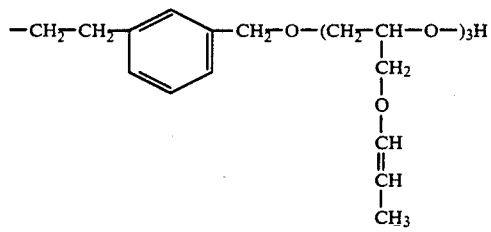

According to a further aspect of the invention, a method for the production of the inventive modified organopolysiloxanes is provided. Pursuant to this method, a polyoxyalkylene ether of the general formula

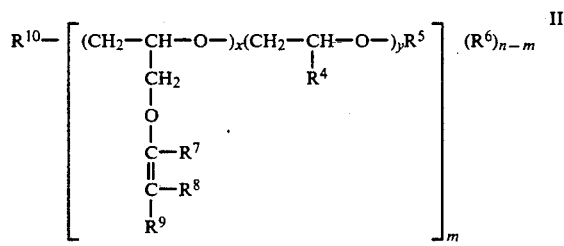

wherein
R$^{10}$ is an n-valent group having an olefinic double bond capable of forming an addition product with an SiH group, said n-valent group being linked with m-polyether groups through a —C—C—, —C-O—C—, —C—O—C—,

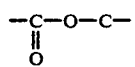

or —C—N—C— linkage, while
R$^4$, R$^5$, R$^6$, R$^7$, R$^8$, R$^9$, n, m, x and y have the above-indicated meanings, is added by an addition reaction, to a polysiloxane of formula IV

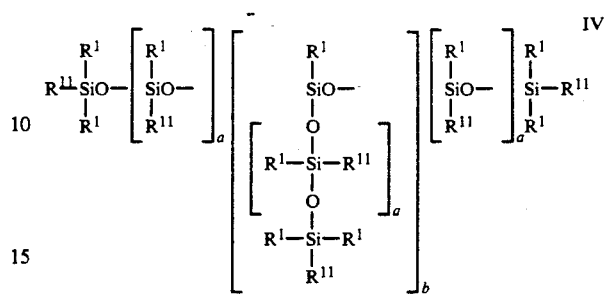

wherein
R$^1$ are the same or different and represent alkyl groups with 1 to 4 carbon atoms or phenyl, with the proviso that at least 90% of the R$^1$ groups are are the same or different and may have the following meanings:
R$^{11}$ are the same or different and may have the following meanings:
(a) alkyl with 1 to 20 carbon atoms, aryl or alkaryl,
(b) hydrogen,
with the proviso that in the average organopolysiloxane molecule, at least one of the R$^{11}$ groups is hydrogen; and
the subscripts a and b have the above-indicated meanings.

The addition reaction is carried out in the presence of transition metals or transition metal complexes at temperatures of about between 25 and 170° C., optionally in the presence of solvents.

In the polyether of formula III, the group R$^{10}$, upon being linked with the polyether groups:
(i) through a —C—C— linkage, is a straight chain or branched hydrocarbon group,
(ii) through a —C—O—C— linkage, is a hydrocarbon oxy group with up to 5 oxy groups wherein the carbon chain may be interrupted by oxygen under ether formation;
(iii) through a

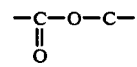

linkage, is a hydrocarbon carboxy group with up to 3 carboxy groups; and
(iv) through a —C—N—C linkage, is a hydrocarbon group with a mono- or disubstituted amino group, the hydrocarbon group in each case comprising an olefinic double bond capable of addition to SiH.

It follows from the above that R$^{10}$ corresponds to R$^3$; however, with the difference that it must comprise an olefinic double bond for the hydrosilylation reaction. This is apparent if one compares R$^3$ and R$^{10}$:

| R$^3$ | R$^{10}$ |
|---|---|
| —(CH$_2$)$_3$—O— | CH$_2$=CH—CH$_2$—O— |

-continued

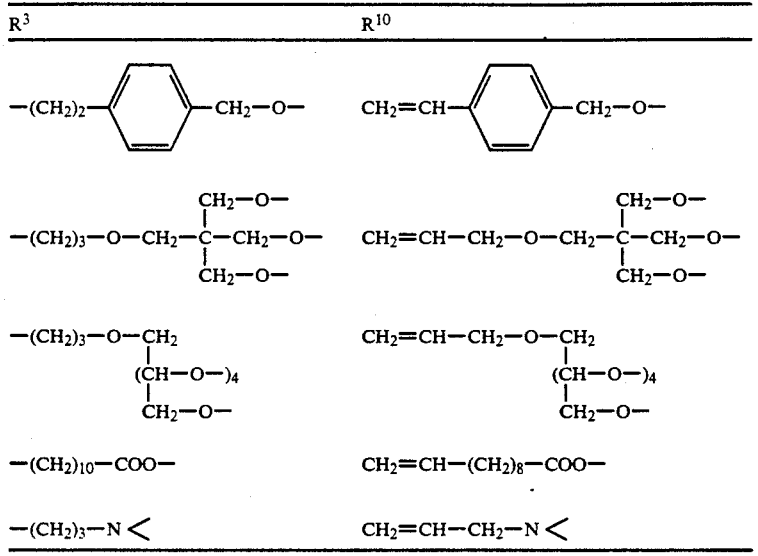

In the molecule, the $R^{11}$ groups are the same or different and may be represented by alkyl with 1 to 20 carbon atoms—corresponding to $R^2$, variation a—or the groups may be hydrogen, with the proviso that at least one of the groups must be hydrogen. Pursuant to the desired inventive compounds, 1 to 30 and, in particular, 2 to 15 $R^{11}$ groups, should be hydrogen.

The hydrosilylation reaction proceeds in the presence of transition metals or transition metal complex catalysts in a manner known per se. Examples of such catalysts are hexachloroplatinic acid or activated charcoal enriched with platinum.

The reaction temperature is about between 25° and 170° C., particularly 50° to 150° C. As solvents, the usual inert organic solvents such as toluene, hexane, diglycoldimethyl ether and the like can be used.

The inventive modified organopolysiloxanes are useful for many purposes. They may thus be used as polysiloxanes in casting masses, the curing preferably being carried out photochemically, as abhesive coating material for flat or planar carriers or as modifying additives in compounds which are curable by radicals, cationically or by UV or electron radiation.

The curing of the inventive compounds is advantageously carried out by UV radiation in the presence of catalysts such as salt-like diaryliodonium or triarylsulfonium compounds or of non-salt-like compounds such as ketosulfones. Examples of such compounds are:

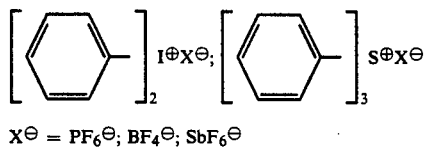

$X^{\ominus} = PF_6^{\ominus}; BF_4^{\ominus}; SbF_6^{\ominus}$

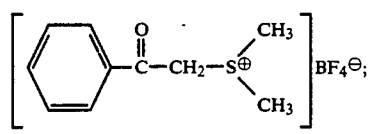

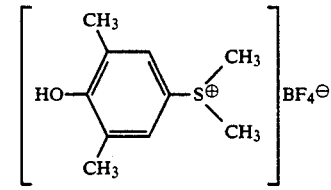

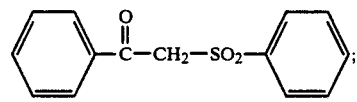

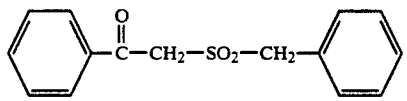

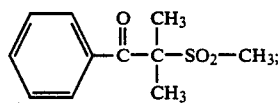

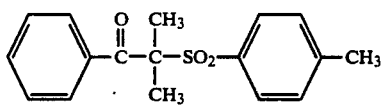

The inventive compounds cure within extremely short time periods, which are fractions of seconds to a few seconds, to form non-adhesive, flexible or hard products. As compared with known compounds of the prior art, the inventive compounds have the important advantage of the arrangement of practically any number of vinyl ether groups, which optionally may be substituted, along the chain of the polymeric molecule. In this manner, the curing speed and the cross linking density may be readily adapted to the requirements flowing from the intended use.

It will be appreciated that the inventive compound, when used for any of the indicated purposes, may be mixed with the usual additives such as modifiers, pigments, fillers, flame protection agents and the like.

The curable compositions may readily be applied to suitable substrates such as metal, rubber, plastics, molded or formed parts, films, foils, paper, wood, glass weaves, cement, ceramics and the like.

Examples of technical applications for the curable compositions pursuant to this invention are protective and decorative as well as insulating coatings, imbedding compositions and masses, printing dye clay, sealers, cements and adhesives, photoresistive lacquers, wire and cable insulation, textile coatings, laminates, impregnated webs and bands, pressure plates and the like.

The invention will now be described in greater detail in the following examples, which are primarily directed to preferred embodiments of the method for producing the inventive compounds and the properties of the compounds by reference to technical applications. It should be understood that these examples are given by way of illustration and not by way of limitation.

EXAMPLE 1

This experiment was carried out in a vessel fitted with a stirrer. 860 gram (5 mole) of a compound which, pursuant to the IH—NMR, has the formula:

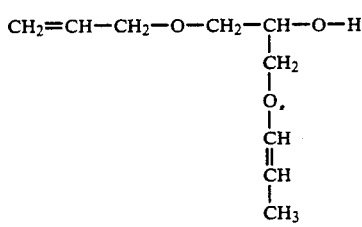

and 38 mg (5 ppm platinum calculated on the total batch) hexachloroplatinic acid × 6 H₂O are introduced into the vessel. During a period of 2 hours, gram (1 mole) of a siloxane of the average formula

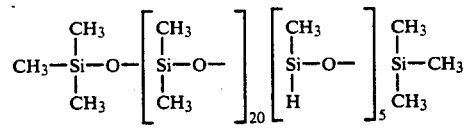

are added at 120° C. in drop-wise manner. The reaction mixture thus obtained is stirred at 100° C. for a period until no more hydrogen is liberated with a solution of 5% sodium butylate in butanol. At reduced pressure, the product is distilled up to 100° C. 2745 gram (98% of the theoretical amount) of a slightly yellowish product of average viscosity are obtained which, pursuant to the ¹H-NMR, has the average formula:

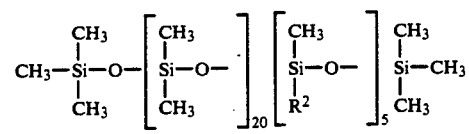

wherein R² is

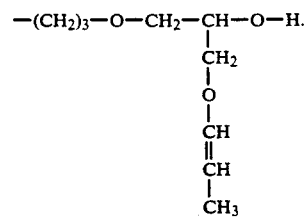

EXAMPLE 2

Into a vessel fitted with a stirrer are charged 600 gram (0.5 mole) of a compound which, according to ¹H-NMR, has the average formula:

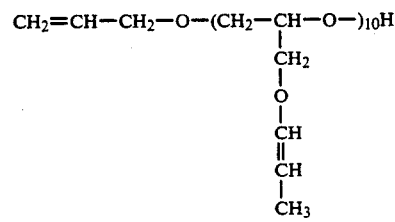

as well as 29 mg (5 ppm platinum, calculated on the total batch), hexachloroplatinic acid × 6 H₂O. During a timer period of two hours, 1526 gram (0.1 mole) of a siloxane of the average formula:

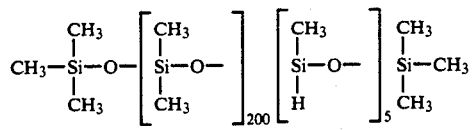

are added at 120° C. in drop-wise manner. The reaction mixture thus obtained is stirred at 100° C. for such a period until no more hydrogen is liberated with a solution of 5% sodium butylate in butanol. At reduced pressure, the product is distilled up to 100° C. 1977 gram (93% of the theorectical amount) of a slightly yellowish product of average viscosity are obtained which, pursuant to the ¹H-NMR, has the average formula:

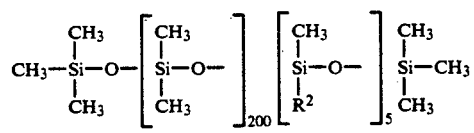

wherein R² is

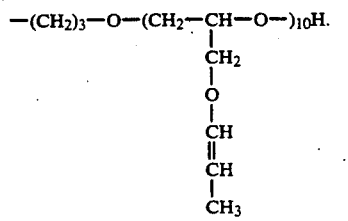

EXAMPLE 3

Into a vessel fitted with a stirrer are charged 1083 gram (0.3 mole) of a compound which, pursuant to ¹H-NMR, has the average formula:

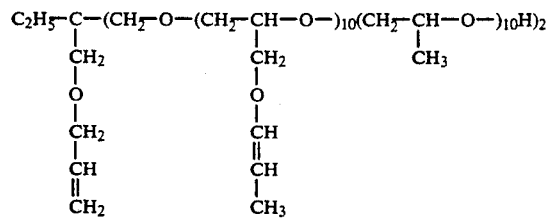

as well as 45 mg (5 ppm platinum, calculated on the total batch), hexachloroplatinic acid × 6 H₂O. During a time period of two hours and at 120° C., 2254 gra (0.1 mole) of a siloxane of the average formula:

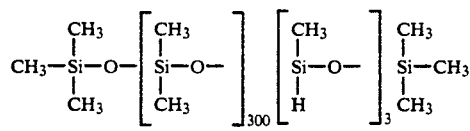

are added in drop-wise manner. The reaction mixture thus obtained is stirred at 100° C. for such a period until no more hydrogen is liberated with a solution of 5% sodium butylate in butanol. At reduced pressure, the product is distilled up to 100° C. 3137 grm (94% of the theoretical amount) of a slightly yellowish viscous product are obtained which, pursuant to the ¹H-NMR, has the average formula:

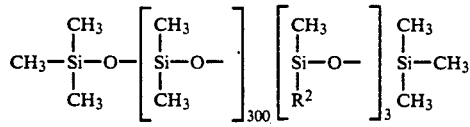

wherein $R^2$ is

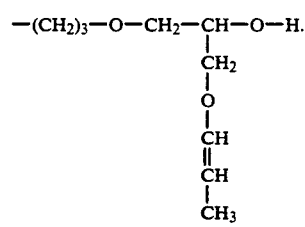

EXAMPLE 4

Into a vessel fitted with a stirrer are chargede 172 gram (1 mole) of a compound which, pursuant to ¹H-NMR, has the formula:

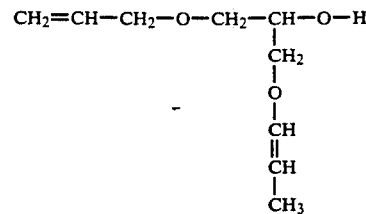

and 13 mg (5 ppm platinum, calculated on the total batch), of hexachloroplatinic acid × 6 H₂O. During a time period of two hours and at 120° C., 816 gram (0.1 mole) of a siloxane of the average formula:

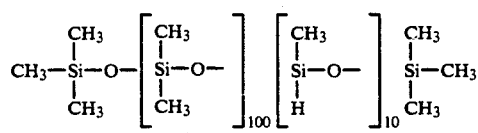

are added at 120° C. in drop-wise manner. The reaction mixture thus obtained was stirred at 100° C. for such a period until no more hydrogen was liberated with a solution 5% sodium butylate in butanol. Under reduced pressure, the product is distilled to a temperature of 100° C. 899 gram (91% of the theoretical amount) of a slightly yellowish product of average viscosity are obtained which, pursuant to the ¹H-NMR, has the average formula:

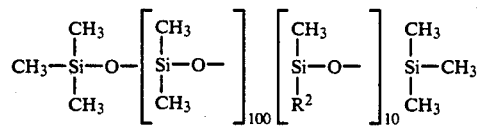

wherein $R^2$ is

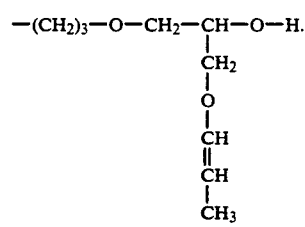

EXAMPLE 5

Into a vessel fitted with a stirrer, 1200 gram (0.5 mole) of a compound which, pursuant to ¹H-NMR, has the average formula:

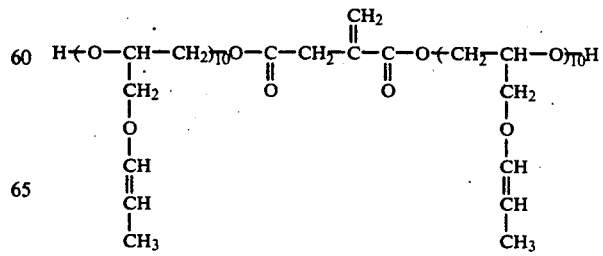

as well as 37 mg (5 ppm platinum, calculated on the total batch), of hexachloroplatinic acid × 6 H₂O. During a time period of two hours and at 120° C., 1526 gram (0.1 mole) of a siloxane of the average formula:

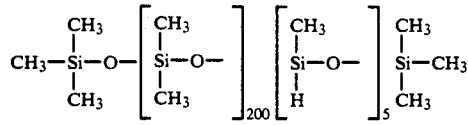

are added in drop-wise manner. The reaction mixture thus obtained is stirred at 100° C. for such a period until no more hydrogen is liberated with a solution of 5% sodium butylate in butanol. At reduced pressure, the product is distilled up to 100° C. 2453 gram (90% of the theoretical amount) of a lsightly yellowish product of average viscosity are obtained which, pursuant to the ¹H-NMR, has the average formula:

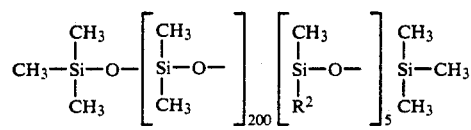

wherein R² is

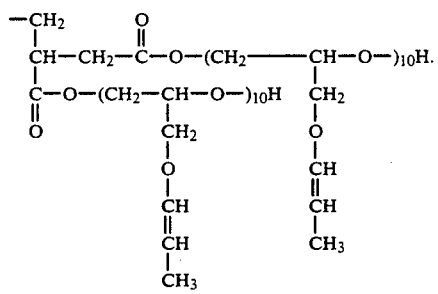

EXAMPLE 6

Into a vessel fitted with a stirrer are charged 620 gram (0.5 mole) of a compound which, according to ¹H-NMR, has the average formula:

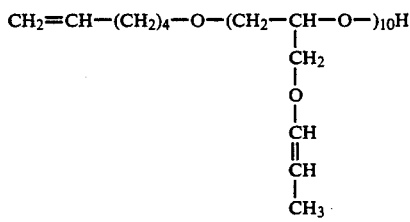

as well as 29 mg (5 ppm platinum, calculated on the total batch), of hexachloroplatinic acid × 6 H₂O. During a time period of two hours and at a temperature of 120° C., 1526 gram (0.1 mole) of a siloxane of the average formula:

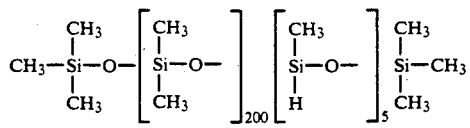

are added in drop-wise manner. The reaction mixture thus obtained is stirred at 100° C. for such a period until no more hydrogen is liberated with a solution of 5% sodium butylate in butanol. At reduced pressure, the product is distilled up to 100° C. 1995 gram (93% of the theoretical amount) of a slightly yellowish product of average viscosity are obtained which, pursuant to the ¹H-NMR, has the average formula:

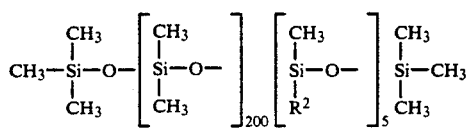

wherein R² is

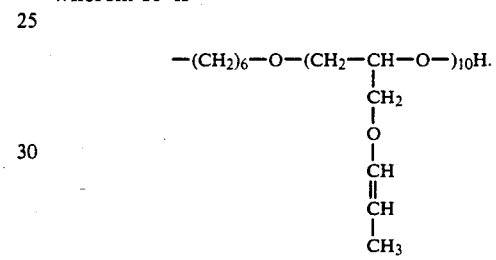

EXAMPLE 7

Into a vessel fitted with a stirrer are charged 605 gram (0.5 mole) of a compound which, according to ¹H-NMR, has the average formula:

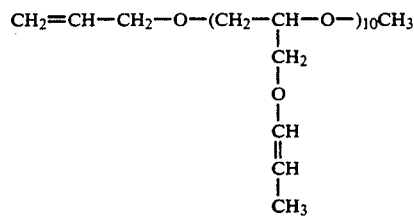

as well as 24 mg (5 ppm platinum, calculated on the total batch), of hexachloroplatinic acid × 6 H₂O. During a time period of two hours and at a temperature of 120° C., 1156 gram (0.1 mole) of a siloxane of the average formula:

$$CH_3-\underset{\underset{CH_3}{|}}{\overset{\overset{CH_3}{|}}{Si}}-O-\left[\underset{\underset{CH_3}{|}}{\overset{\overset{CH_3}{|}}{Si}}-O-\right]_{150}\left[\underset{\underset{H}{|}}{\overset{\overset{CH_3}{|}}{Si}}-O-\right]_{5}\underset{\underset{CH_3}{|}}{\overset{\overset{CH_3}{|}}{Si}}-CH_3$$

are added in drop-wise manner. The reaction mixture thus obtained is stirred at 100° C. for such a period until no more hydrogen is liberated with a solution of 5% sodium butylate in butanol. At reduced pressure, the product is distilled up to 100° C. 1620 gram (92% of the theoretical amount) of a slightly yellowish product of average viscosity are obtained which, pursuant to the $^1$H-NMR, has the average formula:

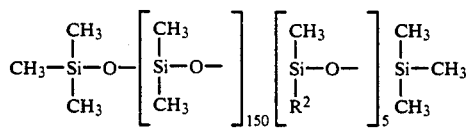

wherein R$^2$ is

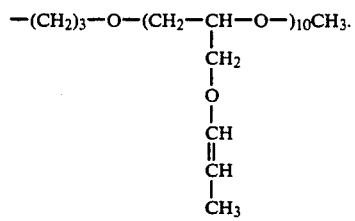

EXAMPLE 8

Into a vessel fitted with a stirrer are introduced 686 gram (0.7 mole) of a compound which, according to $^1$H-NMR, has the average formula:

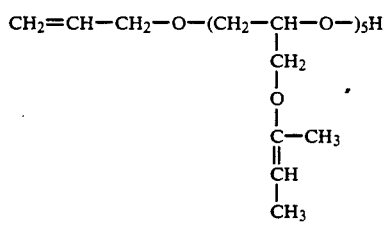

as well as 212 gram (2 mole) of a-methylstyrene with 34 mg (5 ppm platinum, calculated on the total batch), of hexachloroplatinic acid × 6 H$_2$O. During a time period of two hours and at a temperature of 120° C., 1854 gram (0.1 mole) of a siloxane of the average formula:

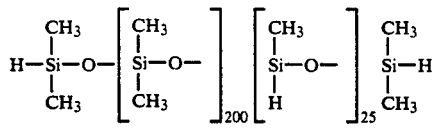

are added in drop-wise manner. The reaction mixture thus obtained is stirred at 100° C. for such a period until no more hydrogen is liberated with a solution of 5% sodium butylate in butanol. At reduced pressure, the product is distilled up to 100° C. 2286 gram (90% of the theoretical amount) of a slightly yellowish product of average viscosity are obtained which, pursuant to the $^1$H-NMR, has the average formula:

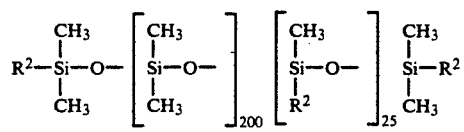

wherein R$^2$=26%

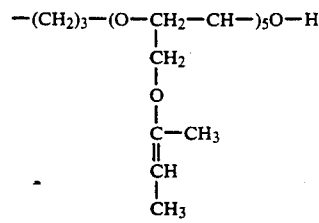

and 74%

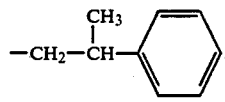

EXAMPLE 9

Into a vessel fitted with a stirrer are charged 535 gram (0.5 mole) of a compound which, according to $^1$H-NMR, has the average formula:

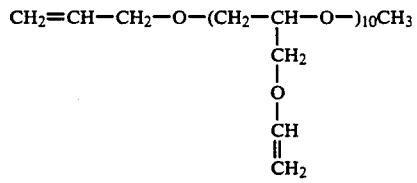

as well as 30 mg (5 ppm platinum, calculated on the total batch), of hexachloroplatinic acid × 6 H$_2$O. During a time period of two hours and at a temperature of 120° C., 1700 gram (0.1 mole) of a siloxane of the average formula:

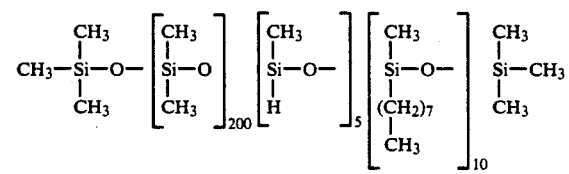

are added in drop-wise manner. The reaction mixture thus obtained is stirred at 100° C. for such a period until no more hydrogen is liberated with a solution of 5% sodium butylate in butanol. At reduced pressure, the product is distilled up to 100° C. 2123 gram (95% of the theoretical amount) of a slightly yellowish product of average viscosity are obtained which, pursuant to the $^1$H-NMR, has the average formula:

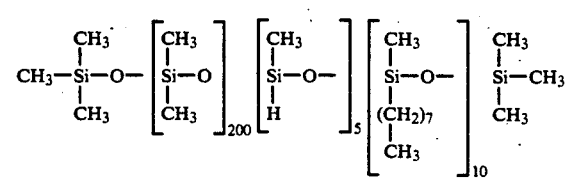

wherein R$^2$ is

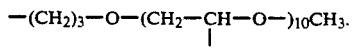

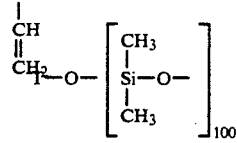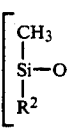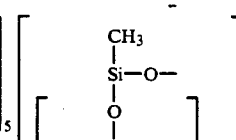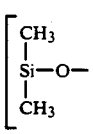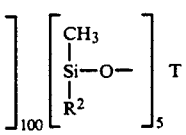

T = (CH$_3$)$_3$Si—

EXAMPLE 10

Into a vessel fitted with a stirrer are charged 2140 gram (2 moles) of a compound which, pursuant to $^1$-NMR, has the average formula:

as well as 71 mg (5 ppm platinum, calculated on the total batch), of hexachloroplatinic acid × 6 H$_2$O. During a time period of two hours and at a temperature of 120° C., 3126 gram (0.1 mole) of a siloxane of the average formula:

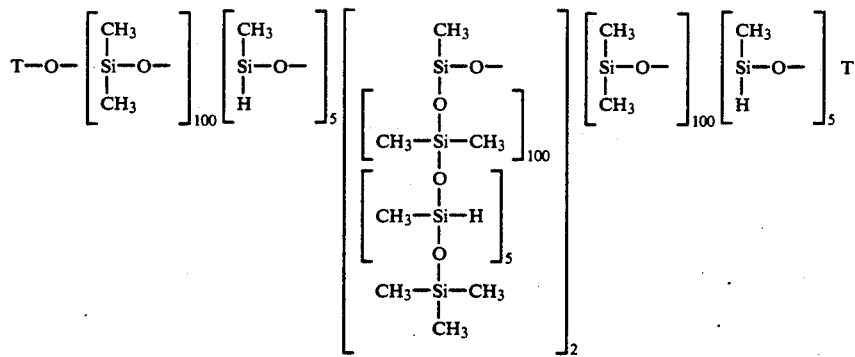

T = (CH$_3$)$_3$Si— are added in dropwise manner. The reaction mixture is stirred at 100° C. until no more hydrogen is liberated with a solution of 5% sodium butylate in butanol. At reduced pressure, the prodcut is distilled upt o a temperature of 100° C. 4792 gram (91% of the theoretical amount) of a slightly yellowish viscous product is obtained which, pursuant to $^1$H-NMR, has the average formula:

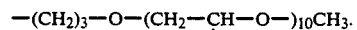

wherein R$^2$ is

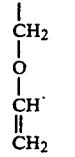

APPLICATION TECHNICAL TESTS

With a view to testing the application technical characteristics of the inventive modified polysiloxanes, the products of Examples 1-10 are well mixed with 2% by weight of bis(dodecylphenyl)iodonium hexafluoroantimonate and are applied to different flat carriers (oriented polypropylene film, glazed paper). The curing was accomplished by means of an ultraviolet lamp from the firm Fusion Systems Corporation, Rockville, MD, U.S.A., Model I-300-B, at a web speed of 25 m/minute. The distance of the lamp to the web was 53 mm in ordinary ambient air. The amount of product applied was, in each case, about 1.1 gram/m$^2$.

For purposes of comparison tests, different adhesive strips of 30 mm width were used, namely, adhesive strips coated with acrylate adhesives which are available commercially under the designation Tesa® 154 and Tesa® 970.

In order to measure the abhesiveness, these adhesive strips were applied to the substrate by rollers and were subsequently stored at 70° C. After 24 hours of storage, the force was measured which was necessary in order to pull off the respective adhesive strip from the substrate at a peeling angle of 180°. This force is indicated as the release force.

In addition, a test was performed of the adhesion of the modified polysiloxanes by vigorous rubbing with the thumb. With unsatisfactory adhesion, rubber-like crumbs are formed (the so-called rub-off test).

In a further series of tests, the photoinitiator bis(-dodecylphenyl)iodoniumhexafluoroantimonate was replaced by 2% by weight of 2-methyl-2-(4-methylphenylsulfonyl)-4-dodecylphenylpropiophenone. The testing was accomplished as in the first series of tests. The values obtained are indicated in the following table in parentheses:

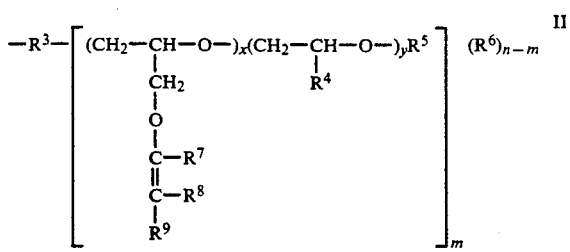

wherein $R^3$ is a $(n+1)$ valent group which is linked with a silicon atom of the organopolysiloxane through a —SiC— linkage and with m polyether groups through —C—C—,

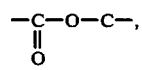

TABLE

| Modified Siloxane Pursuant to Example: | Glazed Paper | | | Oriented Polypropylene Film | | |
|---|---|---|---|---|---|---|
| | Tesa® 154 | Tesa® 970 | Rub Off | Tesa® 154 | Tesa® 970 | Rub Off |
| | Release Force [N] | | | Release Force [N] | | |
| 1 | 6 (5) | 10 (9) | n | 5 (5) | 10 (9) | n |
| 2 | 0.6 (0.6) | 1.3 (1.4) | n | 0.5 (0.5) | 1.3 (1.4) | n |
| 3 | 4 (4) | 8 (8) | n | 4 (4) | 8 (8) | n |
| 4 | 1 (1) | 3 (3) | j | 1 (1) | 3 (3) | j |
| 5 | 1 (1) | 2.5 (2) | n | 1 (1) | 2 (2) | n |
| 6 | 0.5 (0.5) | 1.5 (2) | n | 0.5 (0.5) | 1.3 (2) | n |
| 7 | 2 (2) | 4 (4) | n | 2 (2) | 4 (4) | n |
| 8 | 6 (6) | 10 (9) | n | 6 (5) | 9 (9) | n |
| 9 | 5 (5) | 9 (9) | n | 5 (5) | 9 (9) | n |
| 10 | 0.5 (0.5) | 2 (2) | n | 0.5 (0.5) | 1.5 (2) | n |

We claim:

1. A curable organopolysiloxane having oxyalkylene ether groups linked through SiC-groups and having the general average formula

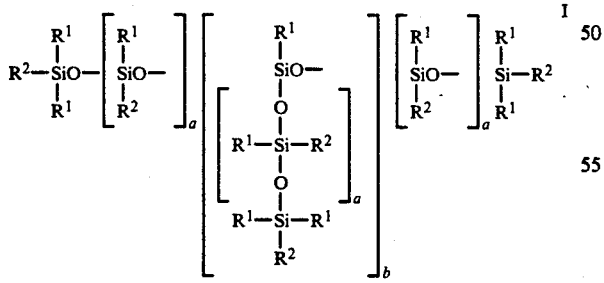

wherein
$R^1$ are the same or different and represent alkyl of 1 to 4 carbon atoms or phenyl, with the proviso that at least 90% of the $R^1$ groups are methyl;
$R^2$ are the same or different and are represented by:
(a) alkyl with 1 to 20 carbon atoms, aryl or aralkyl,
(b) oxyalkylene ether groups of the general formula —C—O—C— or —C—N—C— bonds;
$R^4$ is hydrogen, alkyl or $R^5OCH_2$;
$R^5$ and $R^6$ are hydrogen, alkyl or acyl with the groups $R^4$, $R^5$ and $R^6$ being the same or different in the molecule;
$R^7$, $R^8$ and $R^9$ are hydrogen or alkyl with 1 to 8 carbon atoms, or wherein the groups $R^7$ and $R^8$ or $R^8$ and $R^9$ jointly form a component of a cyclic, non-aromatic hydrocarbon group with 5 or 6 carbon atoms;
n has a value of 1 through 5;
m has a value of 1 through 5 but is not larger than n;
x in the average molecule has a value of 1 to 100; and
y in the average molecule has a value of 0 to 100, with the proviso that $1 \leq x+y < 150$;
a has a value of 1 to 1000; and
b has a value of 0 to 10, with the proviso that in the average organopolysiloxane molecule, at least one $R^2$ group is an oxyalkylene ether group of formula II.

2. A curable organopolysiloxane as claimed in claim 1, wherein $R^3$, upon being linked with said polyether groups:
(i) through a —C—C— linkage, is a straight chain or branched hydrocarbon group;
(ii) through a —C—O—C— linkage, is a hydrocarbon oxy group with up to 5 oxy groups or a hydrocarbon oxy group with up to 5 oxy groups wherein the carbon chain is interrupted by oxygen under ether formation;
(iii) through a

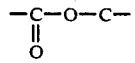

linkage, is a hydrocarbon carboxy group with up to 3 carboxy groups; or (iv) through a —C—N—C— linkage, is a hydrocarbon group with a mono- or disubstituted amino group wherein, in each of (i) through (iv), a carbon atom of the hydrocarbon group is connected with an Si atom of the polysiloxane.

3. A curable organopoloysiloxane as claimed in claims 1 or 2, wherein the average polysiloxane molecule contains 1 to 30 oxyalkylene ether groups.

4. A curable organopolysiloxane as claimed in claims 1 or 2, wherein subscript a has a value of from 5 to 200 and subscript b has a value of from 0 to 2.

5. A curable organopolysiloxane according to claim 4, wherein subscript b has a value of 0.

6. A curable organopolysiloxane according to claims 1 or 2, wherein at least one of the groups $R^7$, $R^8$ and $R^9$ is alkyl.

7. A curable organopolysiloxane according to claim 6, wherein group $R^8$, group $R^9$ or each of groups $R^8$ and $R^9$ is alkyl and group $R^7$ is hydrogen.

8. A curable organopolysiloxane according to claim 7, wherein the group $R^9$ is methyl and groups $R^7$ and $R^8$ are hydrogen.

9. A curable organopolysiloxane according to claim 1 or 2, wherein $R^7$ and $R^8$ are jointly the component of a cyclic, non-aromatic hydrocarbon group with 5 or 6 carbon atoms and $R^9$ is hydrogen.

10. A curable organopolysiloxane according to claims 1 or 2, wherein $1 < x+y < 150$.

11. A curable organopolysiloxane according to claims 1 or 2, wherein $m \cdot x > 1$.

12. A curable organopolysiloxane according to claims 1 or 2, wherein the value of $m \cdot x = 2$ to 25 while the value $m \cdot y = 0$ to 25.

13. A curable organopolysiloxane according to claims 1 or 2, wherein x has a value of from 1 to 25.

14. A curable organopolysiloxane according to claim 12, wherein x has a value of from 2 to 4.

15. A curable organopolysiloxane according to claims 1 or 2, wherein $R^4$ is hydrogen, methyl, ethyl, $HOCH_2$ or $CH_3OCH_2$.

16. A method of preparing a curable polysiloxane having oxyalkylene ether groups linked via —SiC— groups and having the general average formula

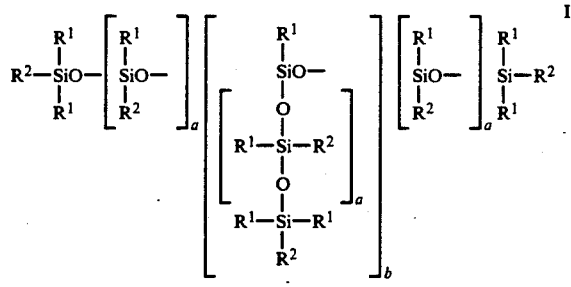

$R^2$ are the same or different and are represented by:
(a) alkyl with 1 to 20 carbon atoms, aryl or aralkyl,
(b) oxyalkylene ether groups of the general formula

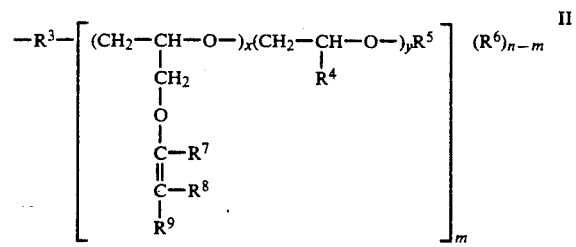

wherein
$R^3$ is a (n+1) valent group which is linked with a silicon atom of the organopolysiloxane through a —SiC— linkage and with m polyether groups through —C—C—,

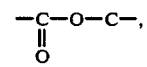

—C—O—C— or —C—N—C— bonds;
$R^4$ is hydrogen, alkyl or $R^5OCH_2$;
$R^5$ and $R^6$ are hydrogen, alkyl or acyl with the groups $R^4$, $R^5$ and $R^6$ being the same or different in the molecule;
$R^7$, $R^8$ and $R^9$ are hydrogen or alkyl with 1 to 8 carbon atoms, or wherein the groups $R^7$ and $R^8$ or $R^8$ and $R^9$ jointly form a component of a cyclic, non-aromatic hydrocarbon group with 5 or 6 carbon atoms;
n has a value of 1 through 5;
m has a value of 1 through 5 but is not larger than n;
x in the average molecule has a value of 1 to 100; and
y in the average molecule has a value of 0 to 100, with the proviso that $1 \leq x+y < 150$;
a has a value of 1 to 1000; and
b has a value of 0 to 10, with the proviso that in the average organopolysiloxane molecule, at least one R group is an oxyalkylene ether group of formula II, said method comprising conducting an addition reaction between a polyoxyalkylene ether of the general formula

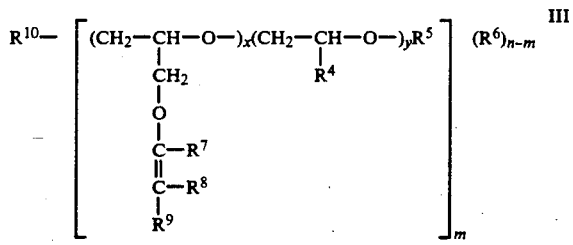

wherein
$R^{10}$ is an n-valent group having an olefinic double bond capable of being added to an SiH group, which n-valent group is linked with m-polyether groups through a —C—C—, —C—O—C—,

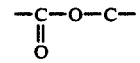

or —C—N—C— linkage and $R^4$, $R^5$, $R^6$, $R^7$, $R^8$, $R^9$, n, m, x and y have the above meaning, and a polysiloxane of the general formula

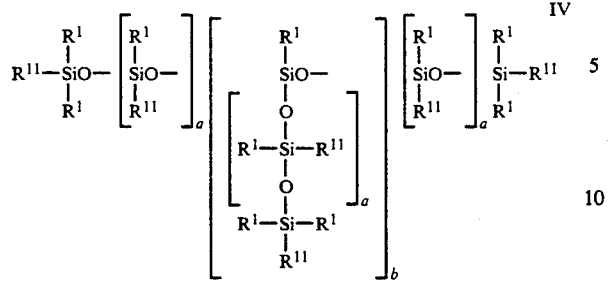

wherein

R$^1$ has the above meaning, and

R$^{11}$ are the same or different and are represented by
(a) alkyl with 1 to 20 carbon atoms, aryl or alkaryl,
(b) hydrogen, with the proviso that the average organopolysiloxane molecule contains at least one R$^{11}$ group in the form of hydrogen; and wherein a and b have the above meaning, said addition reaction being carried out in the presence of transition metals or transition metal complexes and at temperatures of about between 25° to 170° C.

17. A method as claimed in claim 16, wherein the reaction is carried out in the presence of a solvent.

18. A method as claimed in claim 16, wherein in the polyether of formula III, the group in being linked with the polyether groups:
  (i) through a —C—C— linkage, is a straight chain or branched hydrocarbon
  (ii) through a —C—O—C— linkage, is a hydrocarbon oxy group with up to 5 oxy groups or a hydrocarbon oxy group with up to 5 oxy groups wherein the carbon chain is interrupted by oxygen under ether formation;
  (iii) through a

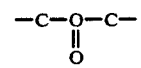

linkage, is a hydrocarbon carboxy group with up to 3 carboxy groups;
  (iv) through a —C—N—C— linkage, is a hydrocarbon group with a mono- or disubstituted amino group, wherein in each of (i) through (iv), the hydrocarbon group contains a double bond capable of addition to SiH.

19. A casting composition comprising the curable polysiloxane defined in claim 1 or 2 in an amount effective for casting.

20. A modifier in chemical compounds which are curable by free radicals, cationically or by ultraviolet or electron radiation, said modifier being an organopolysiloxane of claim 1 or 2.

* * * * *